US007277097B2

(12) United States Patent
Chen

(10) Patent No.: US 7,277,097 B2
(45) Date of Patent: Oct. 2, 2007

(54) METHOD FOR IMPLEMENTING MULTIPLE POWER-UP GRAPHICS IN A SINGLE COMPUTER PLATFORM, AND COMPUTER PLATFORM AND STORAGE MEDIUM THEREFOR

(75) Inventor: Hung-Ping Chen, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 174 days.

(21) Appl. No.: 10/355,942

(22) Filed: Jan. 31, 2003

(65) Prior Publication Data
US 2004/0090442 A1 May 13, 2004

(30) Foreign Application Priority Data
Nov. 12, 2002 (TW) .................. 91133185 A

(51) Int. Cl.
G06F 15/00 (2006.01)
G06T 1/60 (2006.01)

(52) U.S. Cl. .................... 345/501; 345/530

(58) Field of Classification Search ........ 345/501, 345/556, 530; 712/1, 2, 100; 713/1, 2, 100
See application file for complete search history.

(56) References Cited

U.S. PATENT DOCUMENTS

| 5,600,766 | A | 2/1997 | Deckys et al. | |
|---|---|---|---|---|
| 6,269,441 | B1 * | 7/2001 | Lee et al. | 713/1 |
| 6,417,869 | B1 * | 7/2002 | Do | 715/718 |
| 6,446,203 | B1 * | 9/2002 | Aguilar et al. | 713/2 |
| 2001/0018661 | A1 * | 8/2001 | Sato et al. | 705/5 |
| 2003/0076346 | A1 * | 4/2003 | Yun | 345/718 |
| 2003/0122864 | A1 * | 7/2003 | Jenne et al. | 345/738 |

FOREIGN PATENT DOCUMENTS

| JP | 02-135528 | 5/1990 |
|---|---|---|
| JP | 04-134527 | 5/1992 |
| JP | 11-305882 | 11/1999 |
| JP | 200156718 A | 2/2001 |
| JP | 2002-157141 | 5/2002 |
| TW | 364096 | 7/1999 |

OTHER PUBLICATIONS

Tischer, Michael, *PC System Programming*, Apr. 1990, pp. iii-v, 8-24 and 220-221, Abacus, Grand Rapids, MI.
K. Mazaki, "An introduction to Linux/FreeDSB customization [customization of Linux Boot logo]", Personal UNIX No. 3, Japan: Everyday communications, Jan. 31, 2000, pp. 60-65, Japan.
K. Mazaki, "An introduction to Linux/FreeDSB customization [customization of Linux Boot logo]", Personal UNIX No. 3, Japan: Everyday communications, Jan. 31, 2000, pp. 82-84, Japan.

* cited by examiner

*Primary Examiner*—Kee M. Tung
*Assistant Examiner*—Hau H Nguyen
(74) *Attorney, Agent, or Firm*—Quintero Law Office

(57) ABSTRACT

A method for utilizing software to implement multiple power-up graphics in a single computer platform. The computer platform receives a power-up graphic mode and determined whether the power-up graphic mode is multiple graphic mode or general graphic mode. The computer platform then displays corresponding power-up graphics according to the power-up mode during power-up, implementing multiple power-up graphics to match IA functions or satisfy user preference.

23 Claims, 2 Drawing Sheets

METHOD FOR IMPLEMENTING MULTIPLE POWER-UP GRAPHICS IN A SINGLE COMPUTER PLATFORM, AND COMPUTER PLATFORM AND STORAGE MEDIUM THEREFOR

BACKGROUND OF THE INVENTION

1. Field of the Invention

The present invention relates to a power-up graphics technology, and in particular to a method for utilizing software to implement multiple power-up graphics in a single computer platform.

2. Description of the Related Art

With the development of the computer industry and the advancement of computer-related technology, a single computer platform not only executes general computer functions but also other extended functions. Especially with the rapid progress of information appliances (IA) in recent years, a single computer platform has become a compound computer platform to combine with IA functions. Generally speaking, computer platforms show related system information in text mode during power-up procedure. In other words, most computer platforms support no power-up graphics, to say nothing of supporting power-up graphics according to different IA functions or user preference.

Although some computer platforms have provided power-up graphics, the provided power-up graphics are limited to the commercial content of a manufacturer or default graphics. If a user desires to change the power-up up graphics during power-up procedure, the desired power-up graphics must be recorded in a record program provided by the computer manufacturer. However, only one can be applied at one time and must be re-recorded each time, presenting inconvenience for users. Unfortunately, the present power-up graphics technology cannot fully satisfy user requirements or coordinate with trends toward frequent utilization of IA.

SUMMARY OF THE INVENTION

Accordingly, an object of the invention is to provide a method for utilizing software to implement multiple power-up graphics in a single computer platform. The method provided by the invention requires no dedicated hardware. Users can choose power-up graphics according to different IA functions or user preference, implemented by software, The invention improves unsolved problems with the present technology.

Another object of the invention is to satisfy user requirements more and match developing trends in the computer industry by displaying power-up graphics corresponding to IA functions in a computer platform, To achieve the present objects, the invention discloses a computer platform, including a display device, a storage device, at least one system BIOS (Basic Input-Output System), and a CPU (Central Processing Unit). The display device displays power-up graphics. The storage device stores archived graphics. The at least one system BIOS includes default graphics. The CPU executes power-up procedure, enables the at least one system BIOS, and receives a power-up graphic mode, which can comprise a multiple graphic mode or a general graphic mode. If the received power-up graphic mode is the multiple graphic mode, the CPU then receives a graphics selection and displays the desired graphics according to the graphics selection. If the received power-up graphic mode is the general graphic mode, the CPU then displays the default graphics and executes the follow-up steps of power-up.

The computer platform disclosed by the invention further includes a flag buffer, saving the graphics selection assigned by an embedded controller, a keyboard controller, or a remote controller, according to a related condition of the computer platform. The related condition of the computer platform can be power-up date or power-up time of the computer platform, a randomly assigned value during power-up, or a different power-up mode of the at least one system BIOS during power-up. The storage device of the computer platform can be a memory device or a hard disk drive.

In addition, the invention discloses a method for utilizing software to implement multiple power-up graphics in a single computer platform. First, a computer platform executes power-up procedures and enables at least one system BIOS. The computer platform then receives a power-up graphic mode. If the power-up graphic mode is multiple graphic mode, the computer platform receives a graphics selection and displays desired graphics accordingly. If the power-up graphic mode is general graphic mode, the computer platform displays default graphics. The computer platform then executes follow-up steps of power-up with the displayed graphics.

The inventive computer platform includes a storage device and a display device. The storage device stores the desired graphics for the multiple graphic mode. The display device shows the power-up graphics. The at least one system BIOS includes the default graphics of the general graphic mode.

As well, the invention discloses a storage medium, for saving a computer program. The computer program implements multiple power-up graphics in a single computer platform. The method includes the steps mentioned.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
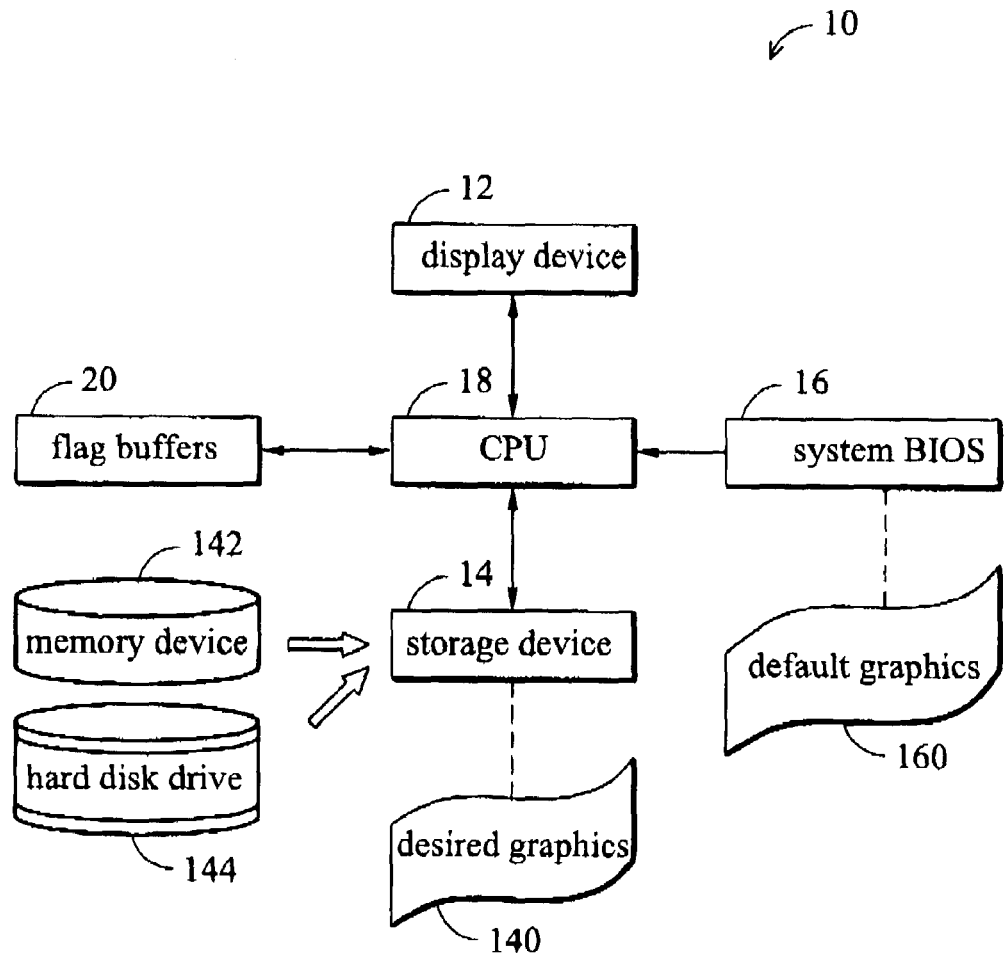
FIG. 1 is a diagram of the computer platform utilizing software to implement multiple power-up graphics.

FIG. 1 is a diagram of the computer platform utilizing software to implement multiple power-up graphics. The invention discloses a computer platform 10, including a display device 12, a storage device 14, at least one system BIOS 16, and a CPU 18.

The display device 12 displays power-up graphics or system related information of the computer platform 10. Generally speaking, the display device 12 displays the system related information or commercial content of a manufacturer during power-up. In the method disclosed by the invention, the display device 12 displays desired graphics 140 of multiple graphic mode and displays default graphics 160 of general graphic mode during power-up.

The storage device 14 can be a memory device 142 or a hard disk drive 144, and stores the desired graphics 140. The desired graphics 140 are the power-up graphics shown on the display device 12 in the multiple graphic mode, similar to the table graphic displays in operating systems, changing background graphics according to user preference.

The at least one system BIOS 16, including power-up test programs, executes system initialization and testing of the computer platform 10 during power-up. The at least one system BIOS 16 includes the default graphics 160 of the general graphic mode. In the general graphic mode, the default graphics 160, shown on the display device 12, accompanies the system initialization and testing of the computer platform 10. For instance, if the default graphics 160 comprise commercial content of a manufacturer, the display device 12 shows the commercial content during system initialization and testing. It the computer provides no power-up graphics, the display device 12 displays system related information in text mode during system initialization and testing.

The CPU 18, coupled to the display device 12, the storage device 14, and the at least one system BIOS 16, is a control and data processing unit of the computer platform 10. One important function of the CPU 18 is to execute power-up of the computer platform 10. The CPU 18 also enables the at least one system BIOS 16 and receives a power-up graphic mode in the inventive method. If the received power-up graphic mode is the multiple graphic mode, the CPU 18 then receives a graphics selection and shows the desired graphics 140 on the display device 12 according to the graphics selection. If the received graphic mode is the general graphic mode, the CPU 18 shows the default graphics 160 on the display device 12.

This graphics selection is saved in a flag buffer 20, assigned by an embedded controller, a keyboard controller, or a remote controller. The embedded controller is a controller built in a computer system. The keyboard controller is coupled to a keyboard. The remote controller usually appears in a customized computer. The three controllers transmit keyboard signals and assign flags. The graphics selection is assigned by a related condition of the computer platform 10. The related condition of the computer platform 10 can be power-up date or power-up time of the computer platform 10, a randomly assigned value during power-up of the computer platform 10, or a different power-up mode of the at least one system BIOS 16 during power-up.

As given above, in an example, the computer platform 10 is a computer platform with IA functions and previously stored power-up graphics of IA functions in the storage device 14, that is, the desired graphics 140. The computer platform 10 executes power-up, enables the at least one system BIOS 16, and receives the multiple graphic mode. The computer platform 10 then displays the desired graphics 140 on the display device 12 according to the graphics selection saved in the flag buffers 20, accomplishing a major aim of the invention.

Figure 2:
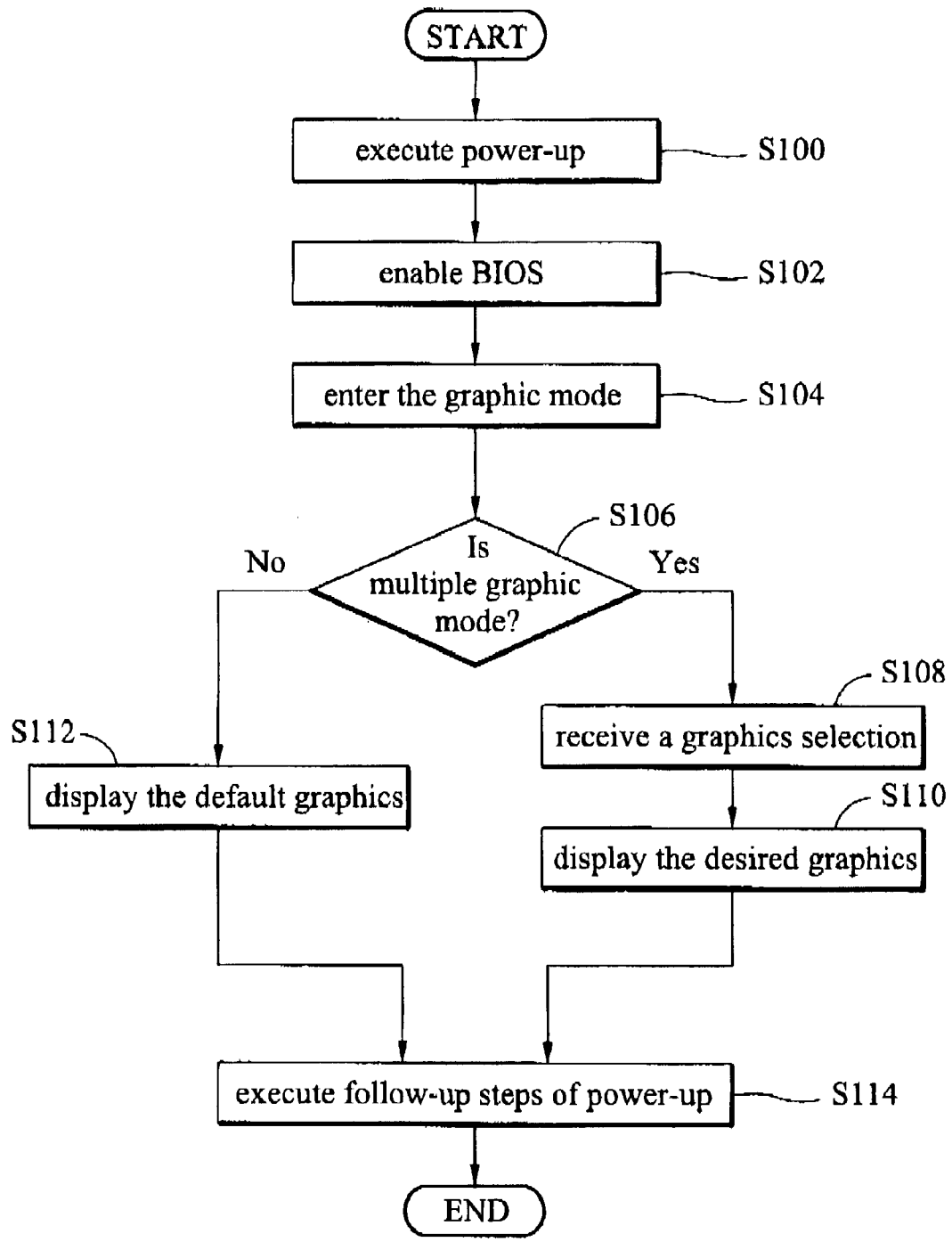
FIG. 2 is a flowchart of the method of utilizing software to implement multiple power-up graphics

FIG. 2 is a flowchart of the method for utilizing software to implement multiple power-up graphics. First, the computer platform executes power-up (step S100) and enables BIOS (step S102). The at least one system BIOS executes system initialization and testing during power-up procedure. The at least one system BIOS includes default graphics of general graphic mode. The default graphics, such as commercial content of the computer manufacturer, accompanied by the system initialization and testing, are displayed on the display device, If the computer manufacturer provides no power-up graphics, the computer platform displays the related system information in text mode during power-up.

The inventive computer platform includes a storage device and a display device. The storage device stores desired graphics for multiple graphic mode, saved previously according to user preference or IA function, For instance, for a computer platform with IA functions, the desired graphics can be graphics of corresponding IA functions, such as TV, radio, and DVD. The display device displays the power-up graphics.

Next, the computer platform enters the graphic mode of power-up (step S104) and receives a power-up graphic mode. The computer platform then identifies whether the received power-up graphic mode is multiple graphic mode or not (step S106). If the power-up graphic mode is multiple graphic mode, the CPU receives a graphics selection (step 108) and displays the desired graphics according to the graphics selection (step S110).

The graphics selection is saved in a flag buffer. The flag buffer can be assigned by an embedded controller, a keyboard controller, or a remote controller. The graphics selection is assigned by a related condition of the computer platform. The related condition can be power-up date or power-up time of the computer platform, a randomly assigned value during power-up, or a different power-up mode according to the at least one system BIOS during power-up. For instance, the computer platform may display the power-up graphics randomly, or display power-up graphics according to the different power-up time, such as morning, noon, or night. Consequently, power-up graphics are varied, and are not limited to a single choice.

In step S106, if the received power-up graphic mode is general graphic mode, the computer platform displays the default graphics of the at least one system BIOS (step S112). Finally, the computer platform executes follow-up steps of power-up with the displayed graphics (step 114).

Thus, the invention provides a computer platform and method for utilizing software to implement multiple power-up graphics in a single computer platform. The method disclosed by the invention improves the unsolved problems of the present technology and avoids the cost of hardware redesign. Especially in the field of computer platforms with IA functions, the method represents a significant advantage.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for utilizing software to implement multiple power-up graphics in a single computer platform, comprising:

providing a computer platform having a general power-up graphic mode and a multiple power-up graphic mode, the multiple power-up graphic mode corresponding to at least one extended function of the computer platform, the computer platform comprising a storage device, a display device, and at least one system BIOS, the at least one system BIOS comprising default power-up graphics of the computer platform;

storing desired power-up graphics in the storage device, the desired power-up graphics corresponding to extended functions of the computer platform, and each of the desired power-up graphics corresponding to a graphics selection;

executing power-up procedures and enabling the at least one system BIOS;

entering a power-up graphic mode;

determining if the power-up graphic mode is the general power-up graphic mode or the multiple power-up graphic mode;

if the power-up graphic mode is the general power-up graphic mode, displaying the default power-up graphics on the display device; and if the power-up graphic mode is the multiple power-up graphic mode, displaying desired power-up graphics corresponding to an assigned graphics selection on the display device, wherein the desired power-up graphics and default power-up graphics are graphics displayed by the display device;

wherein the computer platform has a plurality of extended information appliances (IA) functions, and the step of storing desired power-up graphics in the storage device includes storing desired power-up graphics for each extended function.

2. The method for utilizing software to implement multiple power-up graphics in a single computer platform of claim 1, further comprising the step of executing follow-up steps of the power-up with the displayed graphics.

3. The method for utilizing software to implement multiple power-up graphics in a single computer platform of claim 1, further comprising the step of storing the assigned graphic selection in a flag buffer.

4. The method for utilizing software to implement multiple power-up graphics in a single computer platform of claim 3, further comprising the step of assigning the assigned graphics selection with an embedded controller of the computer platform.

5. The method for utilizing software to implement multiple power-up graphics in a single computer platform of claim 3, further comprising the step of assigning the assigned graphics selection with a keyboard or a remote controller of the computer platform.

6. The method for utilizing software to implement multiple power-up graphics in a single computer platform of claim 1, further comprising the step of assigning the assigned graphics selection according to a related condition of the computer platform.

7. The method for utilizing software to implement multiple power-up graphics in a single computer platform of claim 1, further comprising the step of assigning the assigned graphics selection according to the power-up date or power-up time of the computer platform.

8. The method for utilizing software to implement multiple power-up graphics in a single computer platform of claim 1, further comprising the step of assigning the assigned graphics selection according a power-up mode of the computer platform.

9. The method for utilizing software to implement multiple power-up graphics in a single computer platform of claim 1, further comprising the step of randomly assigning the assigned graphics selection during power-up of the computer platform.

10. The method for utilizing software to implement multiple power-up graphics in a single computer platform of claim 1, wherein the step of storing desired power-up graphics in the storage device includes storing a plurality of desired power-up graphics for each extended function.

11. The method for utilizing software to implement multiple power-up graphics in a single computer platform of claim 1, wherein the storage device is a memory device.

12. The method for utilizing software to implement multiple power-up graphics in a single computer platform of claim 1, wherein the storage device is a hard disk drive.

13. The method for utilizing software to implement multiple power-up graphics in a single computer platform of claim 1, wherein the extended function is an internet appliance function.

14. The method for utilizing software to implement multiple power-up graphics in a single computer platform of claim 1, wherein the extended function is a multimedia function.

15. The method for utilizing software to implement multiple power-up graphics in a single computer platform of claim 14, wherein the multimedia function is a TV, radio, or DVD function.

16. A storage medium storing a computer program providing a method for utilizing software to implement multiple power-up graphics in a single computer platform having a general power-up graphic mode and a multiple power-up graphic mode, the multiple power-up graphic mode corresponding to at least one extended function of the computer platform, the method comprising:

executing power-up procedures and enabling at least one system BIOS;

entering a power-up graphic mode;

determining if the power-up graphic mode is the general power-up graphic mode or the multiple power-up graphic mode;

if the power-up graphic mode is the general power-up graphic mode, displaying default power-up graphics on a display device;

if the power-up graphic mode is the multiple power-up graphic mode, displaying desired power-up graphics corresponding to an assigned graphics selection on a display device, wherein the desired power-up graphics correspond to extended functions of the computer platform; and executing follow-up steps of the power-up with the displayed graphics, wherein the desired power-up graphics and default power-up graphics are graphics displayed by the display device;

wherein the computer platform has a plurality of extended information appliances (IA) functions, and the step of storing desired power-up graphics in the storage device includes storing desired power-up graphics for each extended function.

17. The storage medium of claim 16, wherein the method further comprises the step of assigning the assigned graphics selection according to the power-up date or power-up time of the computer platform, assigning the assigned graphics selection according a power-up mode of the computer platform, or randomly assigning the assigned graphics selection during power-up of the computer platform.

18. The storage medium of claim 16, wherein the extended function is an internet appliance function.

19. The storage medium of claim 16, wherein the extended function is a multimedia function.

20. A computer platform implementing multiple power-up graphics in a single computer platform, comprising:

a general power-up graphic mode;

a multiple power-up graphic mode, the multiple power-up graphic mode corresponding to at least one extended function of the computer platform;

a storage device storing desired power-up graphics, the desired power-up graphics corresponding to extended functions of the computer platform, and each of the desired power-up graphics corresponding to a graphics selection;

a display device;

at least one system BIOS, the at least one system BIOS comprising default power-up graphics of the computer platform;

a CPU, coupled to the display device, storage device, and the at least one system BIOS, the CPU executing power-up procedures and enabling the at least one system BIOS, entering a power-up graphic mode, determining if the power-up graphic mode is the general power-up graphic mode or the multiple power-up graphic mode, wherein the default power-up graphics are displayed on the display device if the power-up graphic mode is the general power-up graphic mode, and wherein desired power-up graphics corresponding to an assigned graphics selection are displayed on the display device if the power-up graphic mode is the multiple power-up graphic mode, wherein the desired power-up graphics and default power-up graphics are graphics displayed by the display device;

wherein the computer platform has a plurality of extended information appliances (IA) functions, and the step of storing desired power-up graphics in the storage device includes storing desired power-up graphics for each extended function.

21. The computer platform of claim 20, wherein the assigned graphics selection is assigned according to the power-up date or power-up time of the computer platform, according a power-up mode of the computer platform, or is randomly assigned during power-up of the computer platform.

22. The computer platform of claim 20, wherein the extended function is an internet appliance function.

23. The computer platform of claim 20, wherein the extended function is a multimedia function.

* * * * *